US007591615B2

(12) United States Patent
Li et al.

(10) Patent No.: US 7,591,615 B2
(45) Date of Patent: Sep. 22, 2009

(54) SHEET MATERIAL CUTTING MACHINE WITH VACUUM CLEANING SYSTEM

(75) Inventors: Steven Li, Markham (CA); Yoshimasa Okada, Reynoldsburg, OH (US)

(73) Assignees: Trimont Mfg. Inc, Ontario (CA); TS Tech Holding Company, Inc., Wilmington, DE (US)

( * ) Notice: Subject to any disclaimer, the term of this patent is extended or adjusted under 35 U.S.C. 154(b) by 0 days.

(21) Appl. No.: 11/684,213

(22) Filed: Mar. 9, 2007

(65) Prior Publication Data

US 2008/0216625 A1 Sep. 11, 2008

(51) Int. Cl.
*B23B 47/34* (2006.01)

(52) U.S. Cl. ............................ 408/67; 408/58; 408/95; 408/207; 83/100

(58) Field of Classification Search .................. 83/100, 83/684, 686; 408/67, 68, 58, 61, 87, 95, 408/97, 98, 207-209, 703; 409/137
See application file for complete search history.

(56) References Cited

U.S. PATENT DOCUMENTS 2,615,525 A * 10/1952 Berner ....................... 181/293
2,637,396 A * 5/1953 Spiller et al. .................. 408/46
2,963,058 A * 12/1960 Carlson ....................... 408/47
3,690,780 A * 9/1972 Bjelland et al. ............... 408/58
3,730,634 A * 5/1973 Gerber et al. ................. 408/22
3,781,124 A * 12/1973 Bodycomb ................... 408/61
3,830,122 A * 8/1974 Pearl ........................... 83/169
3,942,411 A * 3/1976 Gerber ....................... 409/137
4,037,982 A * 7/1977 Clement ...................... 408/61
4,261,285 A * 4/1981 Pearl ........................... 118/37
4,528,878 A * 7/1985 Gerber .......................... 83/56
4,596,171 A * 6/1986 Gerber .......................... 83/56
5,317,943 A * 6/1994 Dowdle ......................... 83/56
5,429,460 A * 7/1995 Campian .................... 409/137
6,540,456 B2 * 4/2003 Conley ....................... 409/132

* cited by examiner

*Primary Examiner*—Daniel W Howell
(74) *Attorney, Agent, or Firm*—Porter, Wright, Morris & Arthur, LLP

(57) ABSTRACT

A sheet material cutting machine includes a bristle bed with generally vertically extending bristles having free ends defining a support surface for supporting sheet material to be cut and a carriage movable over the bristle bed and carrying at least one cutting tool to selectively cut the sheet material. A vacuum cleaning system provides vacuum at the carriage to remove cutting debris as the cutting tool is cutting the sheet material. Illustrated embodiments include providing the vacuum through a passage in the cutting tool and providing the vacuum through a cavity in a presser foot.

17 Claims, 7 Drawing Sheets

SHEET MATERIAL CUTTING MACHINE WITH VACUUM CLEANING SYSTEM

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to sheet material cutting machines of the type having work material supporting bristle beds and, more particularly, to such machines having systems for removing loose fibers, threads, small pieces of material, and/or other debris which tend to collect in spaces between bristles of the bed.

BACKGROUND OF THE INVENTION

Machines for cutting sheet material such as fabric, cloth, vinyl, leather and the like typically have a work material supporting bed comprising a plurality of generally vertically extending bristles. Upper free ends of the bristles define a work material supporting surface so that the bed may be penetrated by a cutting tool such as a reciprocating knife, a rotating drill, or the like that is used to cut the sheet material. As shown in FIG. 1, one or more sheets 1 of the work material 2 to be cut are typically stacked on the supporting surface 3 and air 4 is passed downwardly through the bed 5 to create vacuum pressure at the supporting surface 4 which holds and compresses the work material 2 in position. If needed the work material 2 is covered with a layer of air impervious material 6 to create the vacuum pressure. Cutting debris 7 tends to collect between the bristles 8 of the bed 5 and should be removed to maintain efficient performance of the machine. The debris 7 can hinder operation of the cutting tool and/or impede air flow through the bed 5.

One method of cleaning the debris from the bristles has been to periodically remove the bristle bed from the machine, such as between work shifts. Bed portions are placed in a cleaning apparatus which removes debris. One such apparatus cleans the bed portions by applying sharp impact forces to the bed portions to shake the accumulated debris from the bristles. For examples of such cleaning apparatus see U.S. Pat. Nos. 4,224,711 and 5,065,469, the disclosures of which are expressly incorporated herein in their entirety by reference. These cleaning apparatus have the disadvantage that to achieve cleaning of the bristle bed, bristle units must be separated from the cutting machine, cleaned by the cleaning apparatus remote from the cutting machine, and reassembled with the cutting machine. This process requires a great deal of time and labor.

Attempts have been made to provide a cleaner capable of cleaning the bristle bed while the bristle bed remains assembled to the cutting machine. One such cleaner includes a plurality of rotary blades and a vibrator to dislodge the debris and a vacuum device to remove dislodged debris. The cleaner replaces the cutting tool on a cutter carriage or is carried by its own carriage. See U.S. Pat. No. 5,361,453, the disclosure of which is expressly incorporated herein in its entirety by reference. Another such cleaner is for a conveyer-type cutting machine and includes pins at an underside of the conveyer that comb the bristles and a vacuum device to remove dislodged debris. The vacuum system for the bed is diverted to the cleaner during cleaning. See U.S. Pat. No. 5,412,836, the disclosure of which is expressly incorporated herein in its entirety by reference. While these cleaners may be capable of cleaning the bristle bed while the bristle bed remains assembled to the cutting machine, they require the cutting machine to be in a down condition.

Attempts have been made to provide a cleaner for cleaning the bristle bed while the cutting machine remains operational. One such cleaner is for a conveyor type cutting machine and delivers jets of compressed air to dislodge debris at an underside of the conveyor so that the debris falls down to the ground. See U.S. Pat. No. 6,058,556, the disclosure of which is expressly incorporated herein in its entirety by reference. Another such cleaner is also for a conveyor type cutting machine but uses a vacuum device to remove debris. See U.S. Pat. No. 6,732,854, the disclosure of which is expressly incorporated herein in its entirety by reference. While these cleaners may be capable of cleaning the bristle bed while the cutting machine remains operational, they essentially clean portions of the conveyor-type bristle bed while they are "off-line." Thus, these cleaners cannot be utilized with non-conveyor type cutting machines. Additionally, debris is not removed until cutting of that portion of the work material is complete. Thus, cutting operations subsequent to initial cutting operations on a particular sheet of work material may be affected by debris created by prior cutting operations.

There is a desire to cut work material with a "zero buffer", that is, without a gap between the end products. A zero buffer results in less wasted work material and thus decreases costs for the end products. To obtain a zero buffer, however, the work material must be precisely positioned and held in place with even vacuum pressure and operation of the cutting tools cannot be hindered by cutting debris. Accordingly, there is a need in the art for an improved sheet material cutting machine which can remove cutting debris as the work material is cut.

SUMMARY OF THE INVENTION

The present invention provides a sheet material cutting machine which attempts to address one or more problems of the related art. According to the present invention, a sheet material cutting machine comprises, in combination, a bristle bed with generally vertically extending bristles having free ends defining a support surface for supporting sheet material to be cut and a carriage movable over the bristle bed and carrying at least one cutting tool to selectively cut the sheet material. A vacuum cleaning system provides vacuum at the carriage to remove cutting debris as the cutting tool is cutting the sheet material.

According to another aspect of the present invention, a sheet material cutting machine comprises, in combination, a bristle bed with generally vertically extending bristles having free ends defining a support surface for supporting sheet material to be cut and a carriage movable over the bristle bed and carrying at least one cutting tool to selectively cut the sheet material. A vacuum cleaning system provides vacuum at the cutting tool to remove cutting debris as the cutting tool is cutting the sheet material.

According to yet another aspect of the present invention, a sheet material cutting machine comprises, in combination, a bristle bed with generally vertically extending bristles having free ends defining a support surface for supporting sheet material to be cut and a carriage movable over the bristle bed and carrying at least one hollow drill to selectively cut the sheet material. A vacuum cleaning system provides vacuum through the hollow drill to remove cutting debris as the hollow drill is cutting the sheet material.

From the foregoing disclosure and the following more detailed description of various preferred embodiments it will be apparent to those skilled in the art that the present invention provides a significant advance in the technology of sheet material cutting machines. Particularly significant in this regard is the potential the invention affords for providing a high quality, reliable cutting which removed cutting debris as the material is cut. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
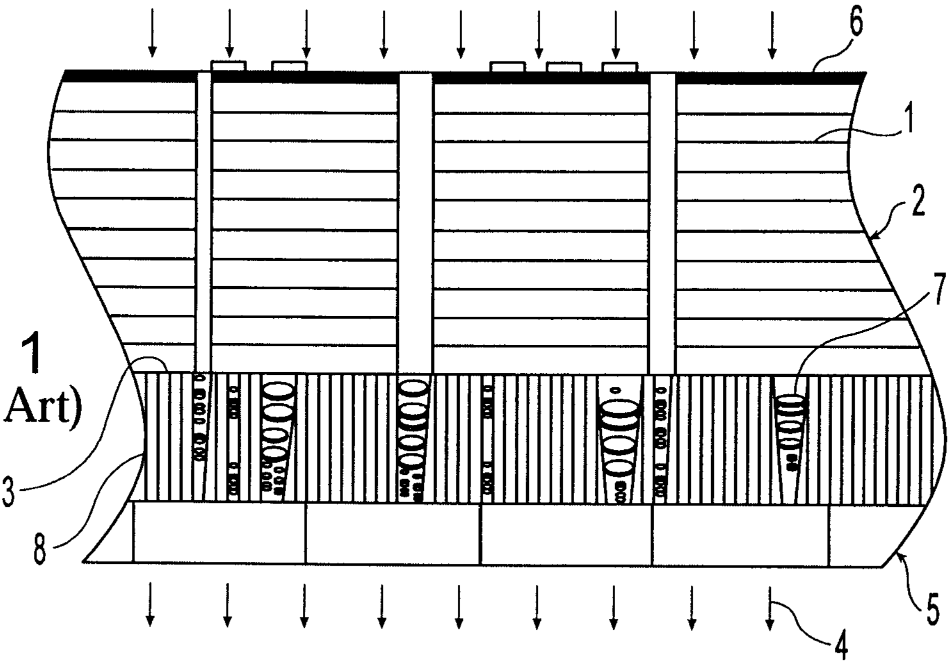
Fig. 1 (Prior Art)
FIG. 1 is a diagrammatic view of cutting debris lodged in bristles of a bristle bed.

It should be understood that the appended drawings are not necessarily to scale, presenting a somewhat simplified representation of various preferred features illustrative of the basic principles of the invention. The specific design features of a sheet material cutting machine as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the sheet material cutting machine illustrated in the drawings. In general, up or upward generally refers to an upward direction within the plane of the paper in FIG. 3 and down or downward generally refers to a downward direction within the plane of the paper in FIG. 3.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved sheet material cutting machines disclosed herein. The following detailed discussion of various alternative and preferred embodiments will illustrate the general principles of the invention with reference to a non-conveyor or stationary type cutting machine for cutting fabric, cloth, vinyl, leather, or the like. Other embodiments suitable for other applications of the invention will be apparent to those skilled in the art given the benefit of this disclosure, such as, for example, a conveyer-type sheet material cutting machine or the like.

Figure 2:
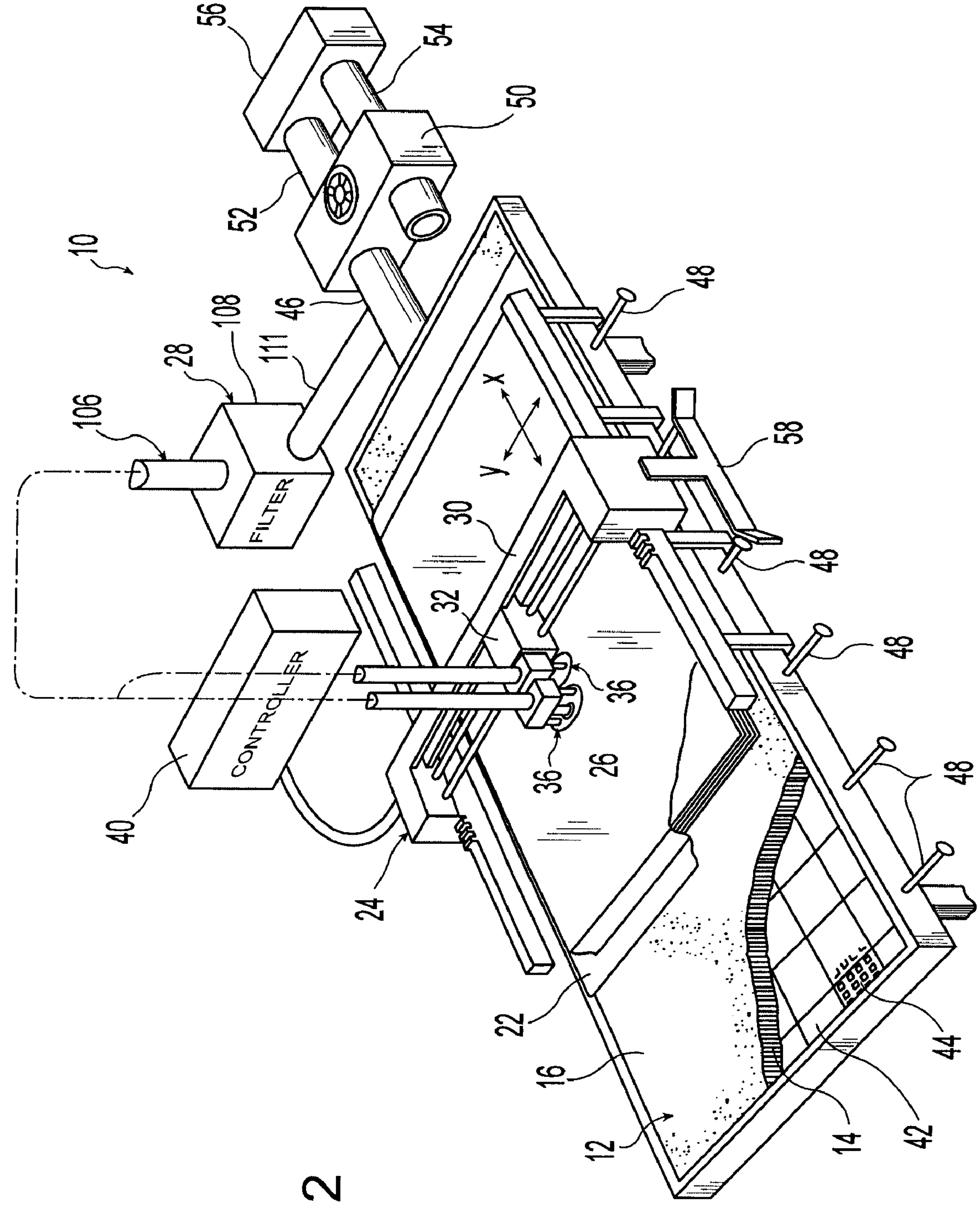
FIG. 2 is a perspective view of a sheet material cutting machine according to a first embodiment of the present invention.

Referring now to the drawings, FIG. 2 shows a sheet material cutting machine 10 according to a preferred embodiment of the present invention. The illustrated sheet material cutting machine 10 includes a bristle bed 12 with generally vertically extending bristles 14 having upper free ends defining a supporting surface 15 for supporting a lay-up of sheets 18 of work material 20 to be cut such as fabric covered by a sheet of air-impermeable material 22, a carriage 24 movable over the bristle bed 12 and carrying at least one cutting tool 26 to selectively cut the work material 20, and a vacuum cleaning system 28 which provides vacuum at the carriage 24 to remove cutting debris as the cutting tool 26 is cutting the sheets 18 of material 20.

The illustrated cutting machine 10 includes an upwardly facing supporting surface 16 provided by the bristle bed 12. The illustrated bristle bed 12 is stationary relative to ground and is comprised of a large number of the generally vertically extending bristles 14, the upper free ends of which define the supporting surface 16. The supporting surface 16 of the illustrated bed has a width dimension parallel to the illustrated Y-coordinate direction and a length dimension parallel to the illustrated X-coordinate direction. The illustrated carriage 24 includes a main or X-direction carriage 30 and a cutting tool or Y-direction carriage 32. The main carriage 30 extends above and across the supporting surface 16 parallel to the width dimension of the supporting surface 16 and is movable in the X direction along the length of the supporting surface 16. The main carriage 30 is supported at both ends by rails 34 having suitable racks and guide surfaces for supporting the main carriage 30 for movement there along under the influence of an X drive motor powering pinions that engage racks on the rails. A pair of cutting tool assemblies 36 each having a cutting tool 26 in the form of a rotatable drill is mounted on the illustrated cutting tool carriage 32. It is noted that other quantities of cutting tool assemblies 36 can be carried by the cutting tool carriage 32 and/or the cutting tools 26 can be of other types such as, for example, reciprocating knives, or combinations of different types of cutting tools 26. The cutting tool carriage 32 is moved in the Y-coordinate direction along the length of the main carriage 30 by a Y drive motor so that by coordinated movements of the main carriage 30 in the X direction and the cutting tool carriage 32 in the Y direction, the cutting tool 26 may be moved along any desired line or location of cut relative to the work material 20. This movement of the carriages 30, 32 and related operations of the cutting tool assemblies 36 are controlled in a conventional manner by a main controller 40. It is noted that the cutting tool assemblies 36 can alternatively be carried by any other suitable type of carriage 24 within the scope of the present invention.

As described in U.S. Pat. No. 4,205,835, the disclosure of which is expressly incorporated herein in its entirety by reference, the bristle bed 12 is preferably comprised of a plurality of smaller bristle units or squares 42, which may be made of injection molded plastic, each of which has a base portion and a plurality of the bristles 14 extending upwardly therefrom. The bristle units 42 rest on a grid 44 below which are a number of vacuum chambers each extending across the width of the bristle bed 12 and arranged successively along the length of the bed 12 with each such vacuum chamber being connectable to a main air duct 46 through operation of associated valve operating members 48.

The main air duct 46 is selectively connected through a selector valve assembly 50 to either the vacuum port 52 or the pressure port 54 of an air pump or turbine 56. When the main air duct 46 is connected to the vacuum port 52 of the air pump 56, each vacuum chamber can be connected to vacuum pressure by pushing its associated operating member 48. The illustrated cutting machine 10 has a cam 58 carried by the main carriage 30 which operates the valve operating members 48 so that vacuum pressure is applied to the vacuum chambers located beneath or close to the cutting tool assemblies 36 so as to compress and hold down the work material 20 primarily in the vicinity of the cutting tool assemblies 36. When the main air duct 46 is connected to the pressurized air port 54 of the air pump 56, pressurized air may be applied to the bristle bed 12 to form an air cushion between the supporting surface 16 and the work material 20 to aid in sliding the work material 20 onto and off of the supporting surface 16.

Figure 3:
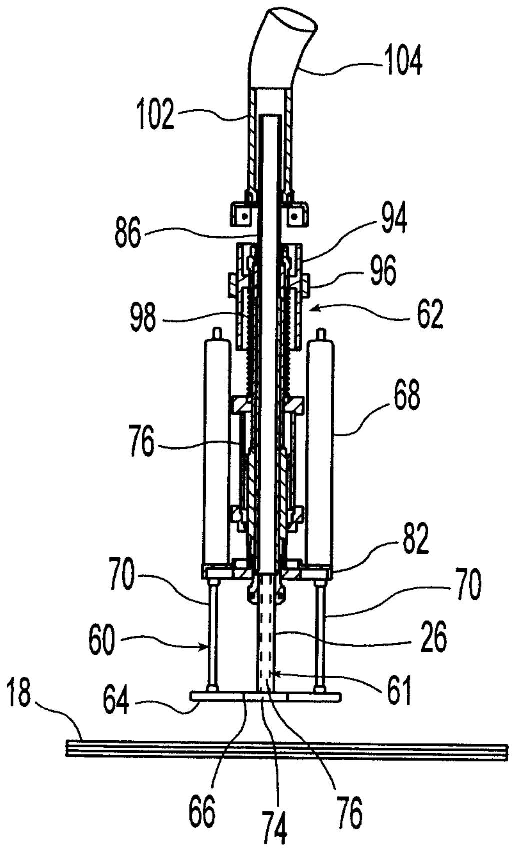
FIG. 3 is an enlarged elevational view, in cross-section, of cutting tool assembly of the sheet material cutting machine of FIG. 2, wherein vacuum is applied to a hollow drill to remove cutting debris.

As best shown in FIG. 3, each of the illustrated cutting tool assemblies 36 include a foot press assembly 60, a cutting tool 26 such as the illustrated hollow drill 61, and an actuation or drill assembly 62 for operating the cutting tool 26 and supported by the foot press assembly 60. The illustrated foot press assembly 60 includes a foot press 64 adapted to engage and press the work material 20 during cutting. The illustrated foot press 64 has a central opening 66 for passage of the cutting tool 26 therethrough to cut the work material 20. Spaced above the foot press 64 is a foot press cylinder 68 that is secured to the foot press 64 by a pair of vertically extending and laterally spaced-apart guides or rods 70. The foot press cylinder 68 is sized and shaped for supporting the drill assembly 62 as described in more detail hereinafter. The illustrated hollow drill 61 is tubular shaped having a central, axially extending passage 72 therethrough. The lower end of the hollow drill 61 is provided with a circular shaped cutting edge 74 for cutting a circular-shaped opening in the work material 20. The hollow drill 61 can be of any suitable size.

Figure 4:
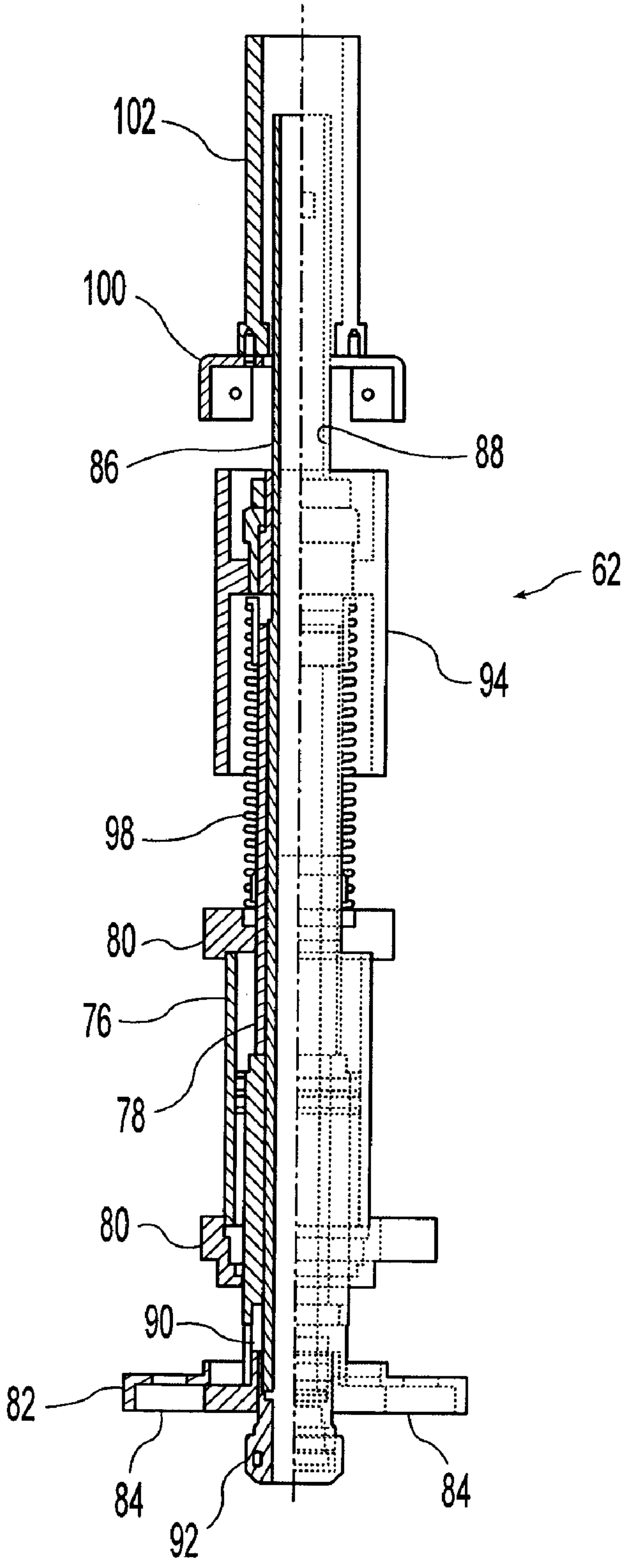
FIG. 4 is an enlarged elevational view, partially in cross-section, of a drill assembly of the cutting tool assembly of FIG. 3.

As best shown in FIG. 4, the illustrated drill assembly 62 includes a cylinder 76 adapted to be secured within the foot press cylinder 68. A piston 78 is provided within and secured to the cylinder 76 and the cylinder 76 is provided with upper and lower end caps 80 to seal the interior space therebetween so that a compressed fluid or the like can be inserted into the cylinder 76 to selectively move the piston 78 in a downward direction as described in more detail hereinafter. The lower end of the piston 78 is secured to a press foot support 82. The press foot support 82 is provided with openings 84 for closely receiving the rods 70 of the press foot assembly 60 to support the lower end of the piston 78 as it moves in the vertical direction.

A hollow shaft or rod 86 having an axially extending passage 88 therethrough extends through the piston 78 and is rotatably supported by the piston 78. Suitable bearings or bushings 90 are provided so that the hollow shaft 86 can rotate about its vertical axis. A lower end of the hollow shaft 86 is provided with a collet and nose piece 92 suitable for releasably securing the hollow drill 61 thereto so that the hollow drill 61 is coaxially rotatable about its central axis along with the hollow shaft 86. Fixed to an upper portion of the hollow shaft 86 is pulley 94 that cooperates with a belt 96 of a drive means. When the drive means is activated to drive the belt 96, the belt 96 rotates the pulley 94 which rotates the hollow shaft 86 connected thereto. Rotation of the hollow shaft 86 rotates the hollow drill 61 to cut a circular-shaped opening in the work material 20 when the hollow drill 61 engages the work material 20.

A spring member 98 is provided about the upper end of the piston 78 and acts between the upper end of the cylinder 76 and the pulley 94 to resiliently bias the hollow shaft 86 and the hollow drill 61 upward to a first or retracted position. When compressed air or other suitable fluid is injected into the cylinder 76 above the piston ring, the piston 78 is driven in a downward direction, along with the hollow shaft 86 and the hollow drill 61 until the hollow shaft 86 and the hollow drill 61 are in second or extended positions wherein the cutting edge 74 engages the work material 20 to cut the opening. When the compressed air is released, the spring member 98 resiliently returns the piston 78, along with the hollow shaft 86 and the hollow drill 61, in an upward direction toward the retracted position.

A mounting bracket 100 is provided for securing a hose connector or adaptor 102 in a fixed position which receives an upper end of the hollow shaft 86. The illustrated adapter 102 is generally tubular shaped with the upper end of the hollow shaft 86 extending therein. The mounting bracket 100 and the adapter 102 are sized and shaped so that the hollow shaft 86 can rotate relative to the adapter 102 while a tube or hose 104 of the vacuum cleaning system 28 is secured to the adapter 102 to provide air and debris flow between the tube 104 and the hollow shaft 86 as described in more detail hereinafter. The hose 104 is preferably soft or flexible so that the carriages 30, 32 can move as desired but can alternatively be of any other suitable type.

Figure 5:
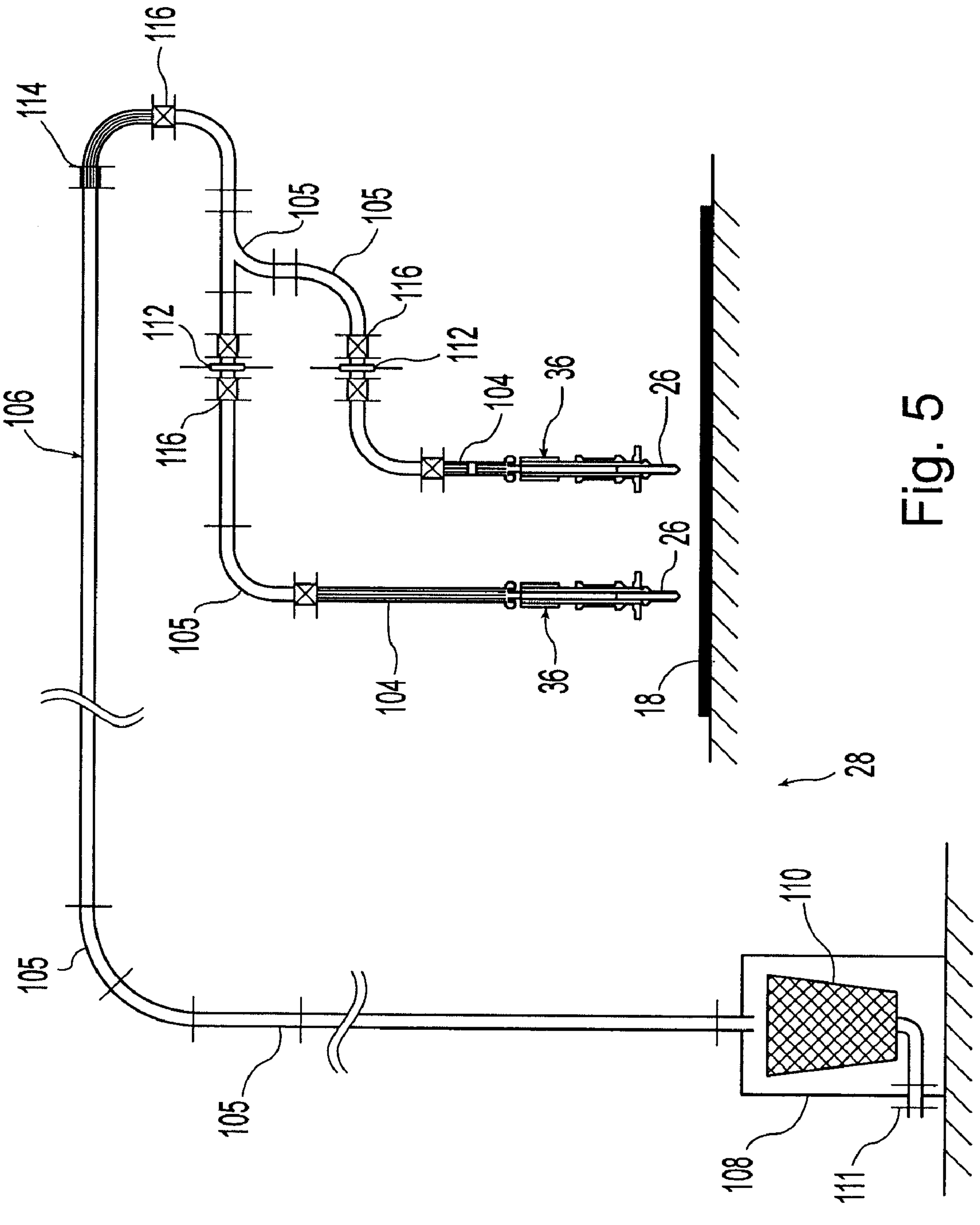
FIG. 5 is a diagrammatic view of a vacuum cleaning system of the sheet material cutting machine of FIG. 2.

As best shown in FIG. 5, the illustrated vacuum cleaning system 28 includes a pipe or hose assembly 106 connecting the upper end of the hollow shafts 86 with a filter 108 having a suitable debris catching basket 110 which is in turn connected to the main air duct 46 with a suitable duct 111 to provide vacuum suction to the hollow drills 61. Suitable valves 112 are provided so that the air flow from the hollow shafts 86 can be selectively opened and closed. The illustrated valves 112 are UVC gate valves suitable connected to receive compressed air and electric control signals from the controller 40. It is noted that any other suitable valves 112 and control system can alternatively be utilized. The illustrated hose assembly 106 includes a plurality of pipe or tube sections 105 suitably connected by rubber adaptors 114 and pipe clamps 116 to complete the air and debris path between the tubes 104 and the filter 108. The tube sections 105 are preferably rigid PVC pipe but can alternatively be of any other suitable type. It is noted that the hollow shafts 86 can alternatively be suitably connected to the filter 108 and main air duct 46 in any other suitable manner. It is also noted that the vacuum cleaning system 28 can alternatively have it own independent air pump 56 if desired.

In operation, the valves 112 are opened to create vacuum pressure at the lower end of the hollow drill 61 whenever the hollow drill 61 is activated to cut the work material 29. As the hollow drill 61 cuts the work material, dust, threads, plugs and other debris is immediately sucked by the vacuum into the hollow drill 61 where it passes through to the hollow shaft 86 and then to the hose assembly 106. Once in the hose assembly 106, the debris passes to the filter 108 where it is caught and retained in the collecting basket 110. When the cutting operation of the hollow drill 61 is complete, the controller 40 preferably closes the valve 112 to cut off the vacuum from the hollow drill 61. The debris is then periodically removed from the collection basket 110 as needed. By removing the debris during the cutting operation, the debris does not become lodged within the bristles 14 of the cutting bed 12 and thus does not affect remaining cutting operations.

Figure 6:
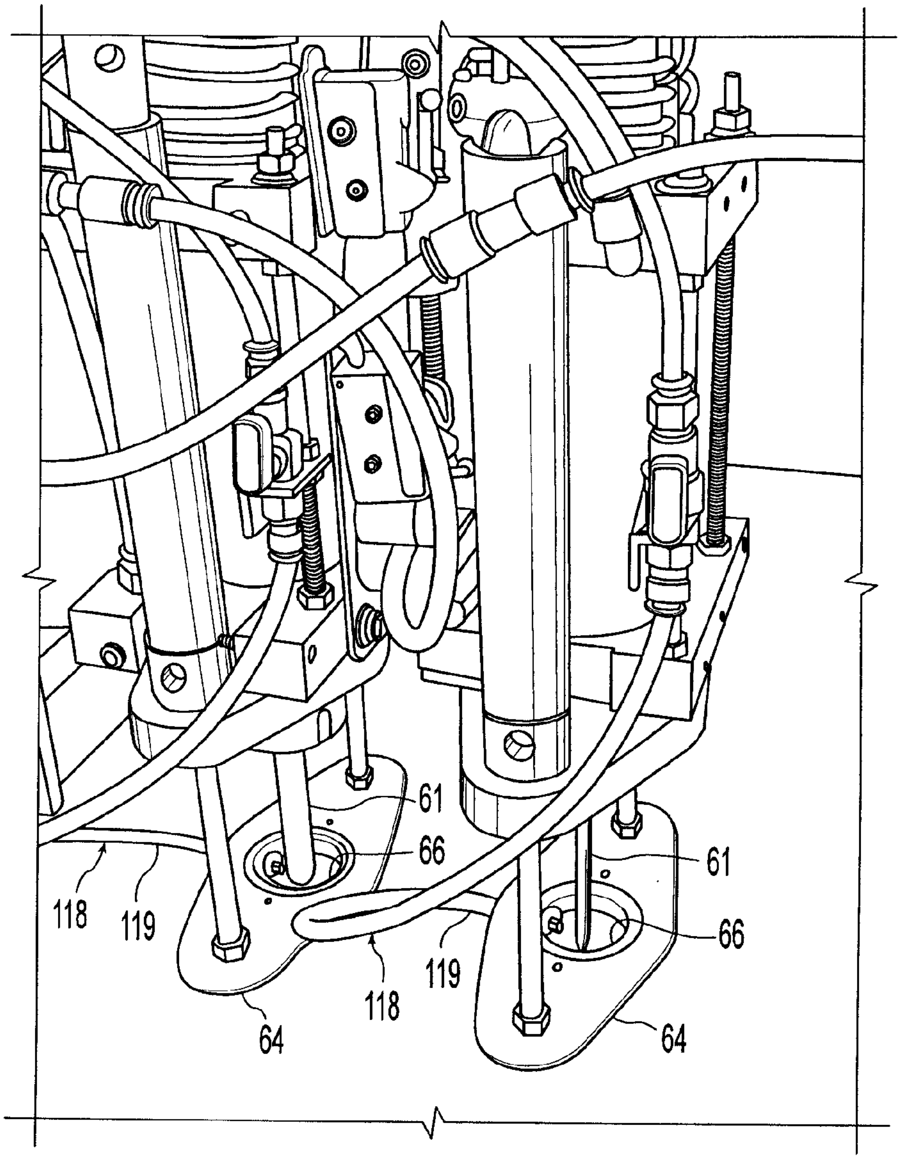
FIG. 6 is an enlarged perspective view of a variation of the cutting tool assembly of FIG. 3, wherein a cooling system is provided.

It has been found that under some conditions, the debris may stick or meld to the interior surface of the hollow drill 61 rather than freely passing through the hollow drill 61. This appears to particularly be the case for relatively small diameter, relatively high speed hollow drills 61 and/or for cutting polymeric materials such as vinyl. As best shown in FIG. 6, the vacuum cleaning system 28 can further include a cooling system 118 to cool at least a portion of the debris path. The illustrated cooling system 118 includes air lines or tubes 119 operably connected to a source of pressurized air and positioned to inject a stream of cooling air onto the exterior surface of the lower end of the hollow drill 61. In this manner, the temperature of the hollow drill 61 can be maintained at a temperature which limits the adherence of debris onto the hollow drill 61. It is noted that any other suitable means for cooling the hollow drill 61 can alternatively be utilized. Alternatively, the internal passage 72 of the hollow drill 61 can be at least partially provided with a low coefficient of friction material to limit adherence of debris to the hollow drill 61.

Figure 7:
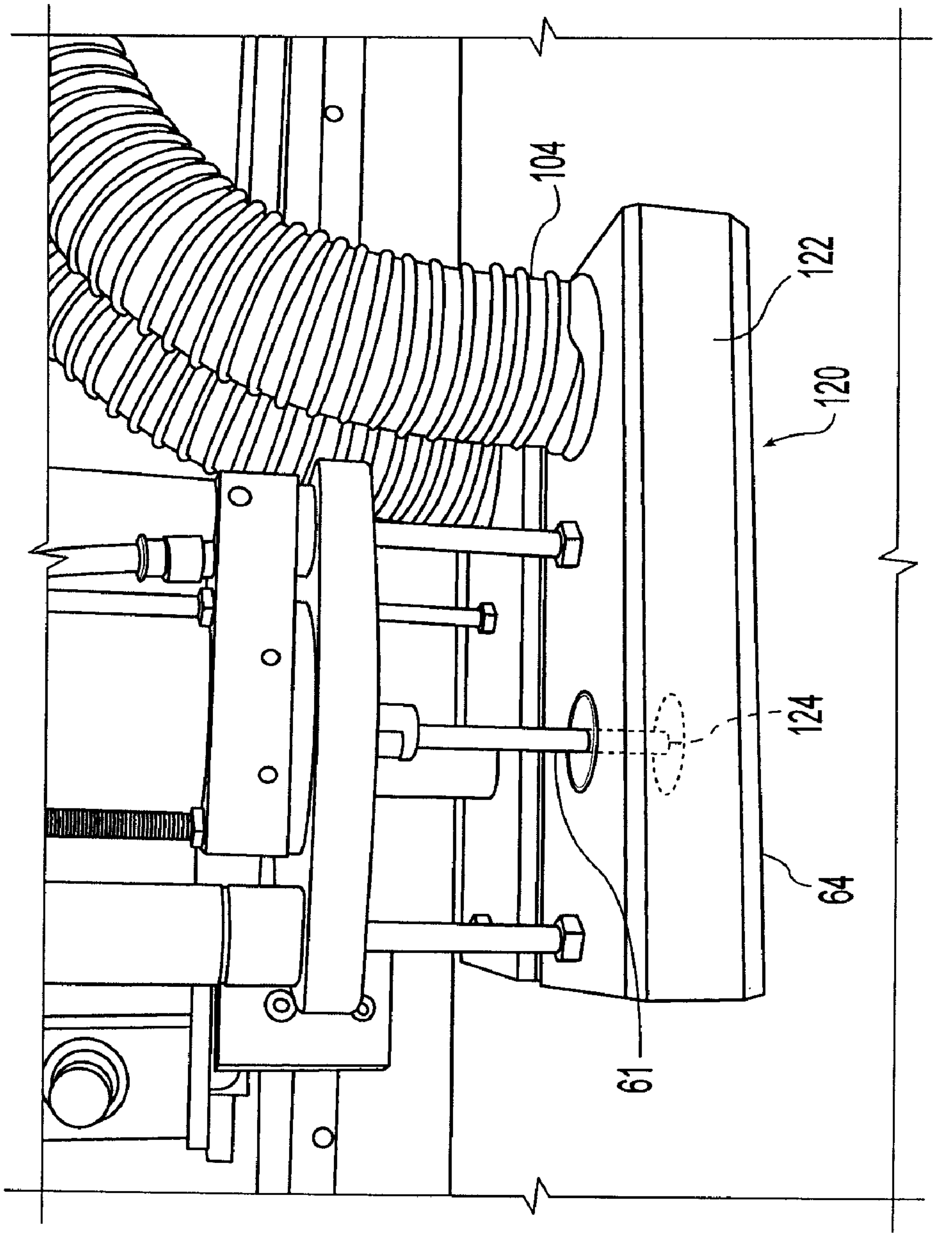
FIG. 7 is a fragmented perspective view of a sheet material cutting machine according to a second embodiment of the invention, wherein vacuum is applied to a chamber formed at a press foot of a cutting tool assembly to remove cutting debris.

FIG. 7 illustrates a sheet material cutting machine 120 according to a second embodiment of the invention which is substantially identical to the first embodiment described hereinabove except that vacuum is provided through the presser foot or foot press 64 rather than directly through the cutting tool 26. The illustrated presser foot 64 is formed to have an internal cavity 122 and the hose assembly 106 is connected directly to the presser foot 64 to selectively form a vacuum within the cavity 122. An opening 124 is provided at the lower wall of the presser foot 64 and forming cavity 122 at the location of the cutting tool 26, such as the illustrated hollow drill 61, so that the vacuum pressure removes debris during the cutting operation and as the cutting tool 26 is withdrawn from the work material 20. It is noted that the presser foot 64 and the cavity 122 can have any suitable size and shape.

Figure 8:
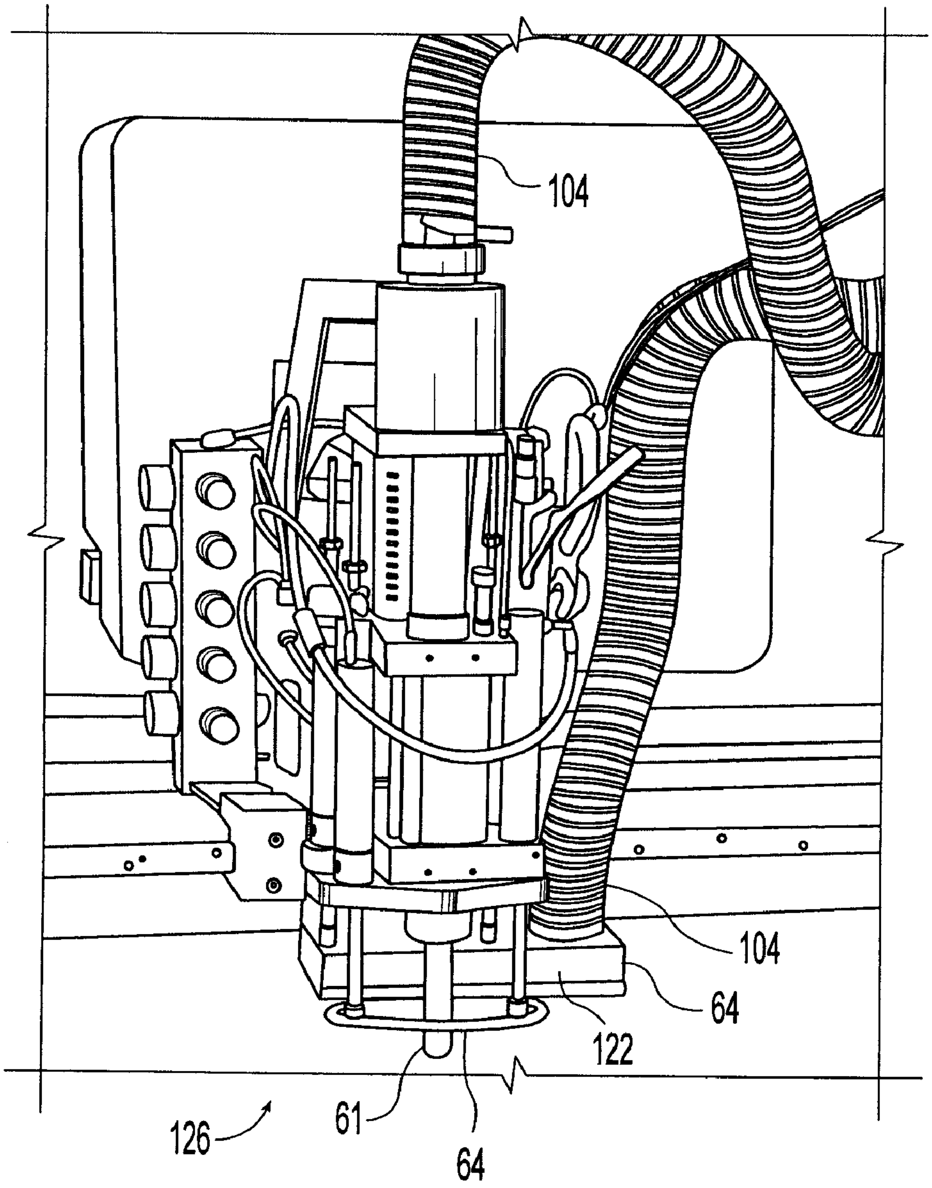
FIG. 8 is a fragmented perspective view of a sheet material cutting machine according to a third embodiment of the invention, wherein one cutting tool has vacuum applied to a hollow drill similar to the first embodiment of the present invention and another cutting tool has vacuum applied to a chamber formed at a press foot similar to the second embodiment of the present invention.

FIG. 8 illustrates a sheet material cutting machine 126 according to a third embodiment of the invention which is substantially identical to the first and second embodiments described hereinabove except that the first cutting tool assembly 36 provides vacuum through the presser foot 64 and the second cutting tool assembly 36 provides vacuum through the cutting tool 26. It is noted that any suitable quantity of either type of cutting tool assembly 36 can be used as desired. This embodiment illustrates that any combination of the various embodiments of the present invention can be utilized.

From the foregoing disclosure and detailed description of certain preferred embodiments, it is apparent that the present invention provides a vacuum cleaning system that effectively removes cutting debris during the cutting operation. Cutting debris that can hinder the cutting tools and/or inhibit a proper vacuum on the work material does not become lodged in the bristles. As a result, the work material can be cut with zero buffers to reduce wasted material.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A sheet material cutting machine comprising, in combination:
- a bristle bed with generally vertically extending bristles having free ends defining a support surface for supporting sheet material to be cut;
- a carriage movable over the bristle bed and carrying at least one cutting tool assembly to selectively cut the sheet material;
- wherein said cutting tool assembly includes a rotating hollow drill having a first end forming a cutting edge, a second end opposed to the first end and an internal passage axially extending from the first end to the second end;
- wherein said cutting tool assembly includes a bracket receiving the second end of the rotating hollow drill and mounted stationary relative to the rotating hollow drill;
- a vacuum cleaning system providing vacuum at the carriage to remove cutting debris as the cutting tool assembly is cutting the sheet material;
- wherein said vacuum cleaning system includes a hose assembly connecting the bracket to a vacuum source to provide vacuum to the internal passage at the second end of the rotating hollow drill to remove cutting debris through the internal passage and the hose assembly as the hollow drill is cutting the sheet material; and
- a controller in communication with the vacuum cleaning system so that the controller deactivates the vacuum within the internal passage when the hollow drill is not cutting the sheet material.

2. The sheet material cutting machine according to claim 1, wherein the cutting tool assembly further includes a rotating solid cutting tool and a chamber formed by a press foot for the cutting tool and the vacuum cleaning system includes a second hose assembly connecting the chamber to a vacuum source to provide vacuum to the chamber to remove cutting debris through the chamber and the second hose assembly as the hollow drill is cutting the sheet material.

3. The sheet material cutting machine according to claim 2, wherein said cutting tool passes through said chamber.

4. The sheet material cutting machine according to claim 1, wherein at least a portion of the debris path within the hollow drill is provided with a cooling system.

5. The sheet material cutting machine according to claim 4, wherein the cooling system includes a tube for blowing a fluid over a portion of the hollow drill along the debris path.

6. The sheet material cutting machine according to claim 1, wherein at least a portion of the internal passage is coated with a low-friction material.

7. A sheet material cutting machine comprising, in combination:
- a bristle bed with generally vertically extending bristles having free ends defining a support surface for supporting sheet material to be cut;
- a carriage movable over the bristle bed and carrying at least one cutting tool assembly to selectively cut the sheet material;

wherein said cutting tool assembly includes a rotating hollow drill having a first end forming a cutting edge, a second end opposed to the first end and an internal passage axially extending from the first end to the second end;

wherein said cutting tool assembly includes a bracket receiving the second end of the rotating hollow drill and mounted stationary relative to the rotating hollow drill;

a vacuum cleaning system providing vacuum at the cutting tool assembly to remove cutting debris as the cutting tool assembly is cutting the sheet material;

wherein said vacuum cleaning system includes a hose assembly connecting the bracket to a vacuum source to provide vacuum to the internal passage at the second end of the rotating hollow drill to remove cutting debris through the internal passage and the hose assembly as the hollow drill is cutting the sheet material;

wherein the hose assembly includes a hose secured to the bracket and coaxial with the hollow drill at the bracket so that the hose is in vacuum communication with the second end of the hollow drill; and a controller in communication with the vacuum cleaning system so that the controller deactivates the vacuum within the internal passage when the hollow drill is not cutting the sheet material.

8. The sheet material cutting machine according to claim 7, wherein the cutting tool assembly further includes a rotating solid cutting tool and a chamber formed by a press foot for the cutting tool and the vacuum cleaning system includes a second hose assembly connecting the chamber to a vacuum source to provide vacuum to the chamber to remove cutting debris through the chamber and the second hose assembly as the hollow drill is cutting the sheet material.

9. The sheet material cutting machine according to claim 8, wherein said cutting tool passes through said chamber.

10. The sheet material cutting machine according to claim 7, wherein at least a portion of the debris path within the hollow drill is provided with a cooling system.

11. The sheet material cutting machine according to claim 10, wherein the cooling system includes a tube for blowing a fluid over a portion of the hollow drill along the debris path.

12. The sheet material cutting machine according to claim 7, wherein at least a portion of the internal passage is coated with a low-friction material.

13. The sheet material cutting machine according to claim 1, wherein the hose assembly includes a hose secured to the bracket and coaxial with the hollow drill at the bracket so that the hose is in vacuum communication with the second end of the hollow drill.

14. The sheet material cutting machine according to claim 1, wherein the vacuum cleaning system includes a filter and a debris collecting basket located along the hose assembly between the bracket and the vacuum source.

15. The sheet material cutting machine according to claim 1, wherein the vacuum cleaning system includes at least one valve located along the hose assembly between the vacuum source and the bracket to selectively deactivate the vacuum within the internal passage when the hollow drill is not cutting the sheet material.

16. The sheet material cutting machine according to claim 7, wherein the vacuum cleaning system includes a filter and a debris collecting basket located along the hose assembly between the bracket and the vacuum source.

17. The sleet material cutting machine according to claim 11, wherein the vacuum cleaning system includes at least one valve located along the hose assembly between the vacuum source and the bracket to selectively deactivate the vacuum within the internal passage when the hollow drill is not cutting the sheet material.

* * * * *